March 12, 1968     W. J. HUIGENS     3,373,352
MAGNETIC CHIP GAUGE UTILIZING A COIL WHOSE TURNS
ARE SHORT CIRCUITED BY CHIPS
Filed Aug. 2, 1965
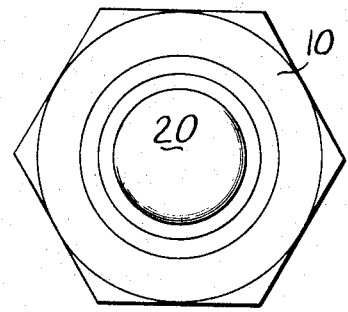
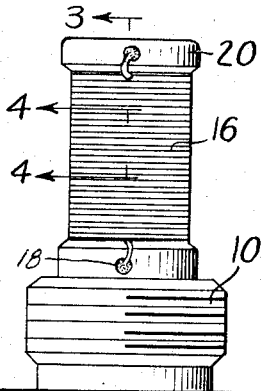
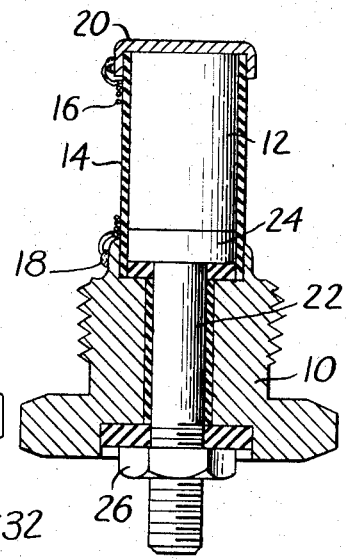
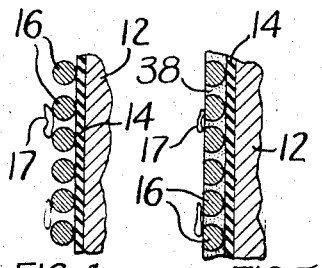
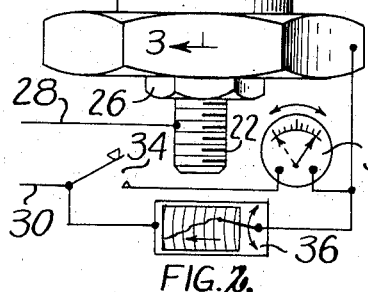
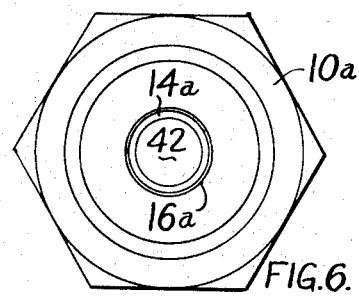
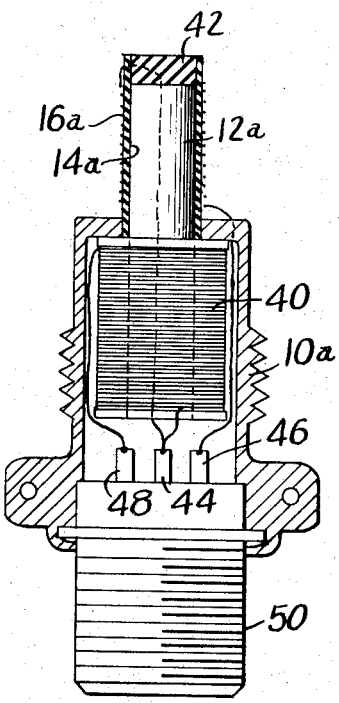
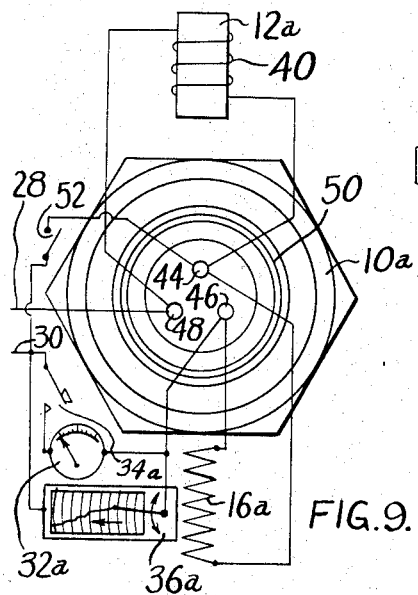
INVENTOR
WILFRED J. HUIGENS
BY Bair, Freeman &
Molinare Attys.

United States Patent Office 3,373,352
Patented Mar. 12, 1968

3,373,352
MAGNETIC CHIP GAUGE UTILIZING A COIL
WHOSE TURNS ARE SHORT CIRCUITED BY
CHIPS
Wilfred J. Huigens, Clarinda, Iowa, assignor to Lisle
Corporation, Clarinda, Iowa, a corporation of Iowa
Filed Aug. 2, 1965, Ser. No. 476,587
8 Claims. (Cl. 324—41)

ABSTRACT OF THE DISCLOSURE

A magnetic chip detector of the monitoring type having a wire so disposed that spaced portions may be short circuited by the deposit of ferrous particles thereon which are attracted by the magnet of the detector. Means is provided for measuring the flow of electricity through the wire to give an indication of the quantity of ferrous particles collected by the magnet.

This invention relates to a magnetic chip detector wherein a magnet is adapted to be positioned in a container for attracting ferrous particles from liquid in such container, the detector being operable to determine the amount of ferrous material collected.

One object of the invention is to provide an electrically operable magnetic chip detector wherein a coil of resistance wire adjacent a particle collecting magnet is affected by the ferrous particles or chips collecting on the resistance wire and means is then provided for determining the amount of ferrous material collected by measuring the electricity flowing through the wire, thus monitoring the accumulation of such particles.

Another object is to provide a detector of the character disclosed in the form of a plug which is removable with respect to a container of liquid whereupon the ferrous particles accumulated on the resistance wire may be removed therefrom.

Still another object is to provide a magnetized element effective to attract ferrous particles from fluid in a housing or the like and means to measure the amount of material so collected by arranging a coil of resistance wire so that the coils thereof are bridged by such particles and determination of the amount of electric current flowing through the coil gives an indication of the amount of ferrous material deposited thereon.

A further object is to provide the magnetized element of the chip detector in the form of an electro-magnet operable when energized to attract the particles and when de-energized to release them.

Still a further object is to provide a coil of wire around a magnetized element with a layer of insulation to electrically separate the two, the coil of wire being capable of having the coils thereof bridged by ferrous material attracted by the magnet whereupon an evaluation of the amount of current flowing through the coil gives a determination of the amount of ferrous material collected on it.

An additional object is to provide means for continuously recording the flow of electricity through the coil to provide a running record of ferrous particle deposit.

With these and other objects in view, my invention consists in the construction, arrangement and combination of the various parts of my monitoring magnetic chip detector, whereby the objects above contemplated are attained, as hereinafter more fully set forth, pointed out in my claims and illustrated in detail on the accompanying drawing, wherein:

FIG. 1 is a plan view of a magnetic chip detector embodying my invention;

FIG. 2 is a side elevation thereof and includes an electrical diagram for a meter and a recorder electrically connected with a resistance coil of the detector;

FIG. 3 is a vertical sectional view on the line 3—3 of FIG. 2;

FIG. 4 is an enlarged sectional view on the line 4—4 of FIG. 2 showing a resistance coil arrangement;

FIG. 5 is a similar sectional view showing a modified resistance coil arrangement;

FIG. 6 is a plan view of a modified form of magnetic chip detector;

FIG. 7 is a side elevation of FIG. 6;

FIG. 8 is a vertical sectional view on the line 8—8 of FIG. 7, and

FIG. 9 is a bottom plan view of the plug shown in FIGS. 6, 7 and 8, combined with an electrical circuit diagram therefor.

On the accompanying drawing I have used the reference numeral 10 to indicate a plug such as one of screw threaded type that can be screwed into the drain plug opening of a transmission housing or the like. A permanent magnet 12 is supported by the plug 10 in an insulation sleeve 14 as illustrated in FIG. 3 on which is wound a resistance coil 16. One end of the coil 16 is grounded at 18 to the plug 10 and the other end is connected to a metal cap 20 at the top of the sleeve 14. A terminal screw 22 having a head 24 is associated with and insulated from the plug 10 and has a terminal nut 26 thereon.

An electrical circuit is established for the resistance coil 16 from the plug 10 through the cap 20, the magnet 12 and the head 24 to the terminal screw 22. Accordingly, current supply wires 28 and 30 as shown in FIG. 2 may be connected to the terminal screw 22 and the plug 10 for energizing the resistance coil 16. As shown in FIG. 2 a meter 32 is provided for measuring the amount of current flowing through the resistance coil and is controlled by a push button 34. A recorder 36 is also shown to provide a continuous recording of changes in resistance of the coil 16 for a purpose which will hereinafter appear.

As shown in FIG. 4, the successive turns of the coil 16 may be tightly wound on the insulation sleeve 14 in spaced relation so that ferrous particles 17 may bridge adjacent turns. An alternative arrangement is shown in FIG. 5 where a suitable varnish or other insulating material 38 (shown stippled) is applied in the spacing between adjacent turns to retain them against electrical contact with each other. The outer surface of the resistance coil may be machined or ground down flat as illustrated to facilitate the bridging action of the ferrous particles 17.

Magnetic plugs are well known in the art, being provided for the purpose of collecting ferrous particles from a transmission housing or the like to prevent the same from causing undue wear of gears and the like in the housing. It is desirable to have a means of determining the quantity of ferrous particles attracted by a magnetic plug and my present invention is designed for that purpose.

The resistance coil 16 will have a predetermined resistance when no particles 17 are present and the resistance will decrease as the quantity of particles bridging the adjacent turns of the coil increases. Accordingly, closure of the electric circuit by means of the push button 34 will give a momentary reading on the meter 32 which may be an ammeter, a micro-ammeter, a volt meter, an ohmmeter or the like. At any time, the operator may thus determine the quantity of ferrous material collected on the magnetic plug by manipulating the push button 34. At some predetermined reading the magnetic plug may be removed from the transmission housing and the particles cleared therefrom.

The recorder 36 can be used if it is desirable to make a recording of the ferrous particle accumulation and this is particularly valuable to show some sudden abnormal increase in the accumulation of particles as might be caused by malfunctioning of gearing or the like such as the breakage of a gear tooth, it being desirable to know immediately when such a condition occurs. The recorder type of apparatus is particularly desirable on airplanes.

In FIGS. 6 to 9, inclusive, I show a modified form of monitoring magnetic chip detector utilizing an electromagnetic coil 40 on a core 12a instead of the permanent magnet 12 of FIG. 3. Several parts of the modified form of plugs are comparable to those described in connection with FIGS. 1 to 5, inclusive and bear the same reference numerals with the addition of the distinguishing characteristic a.

The electro-magnetic coil 40 is wound on the lower end of the core 12a and the upper end projects into the sleeve 14a to attract ferrous particles against the resistance coil 16a. An insulating plug 42 encloses the upper end of the core 12a. I have found that an electro-magnet produces a more uniform magnetic field than a permanent magnet for attraction of particles to the resistance coil 16a and has the additional advantage that it can be deenergized after the plug has been removed from the transmission housing for releasing the accumulated ferrous particles whereupon they fall away from the resistance coil 16a.

A conduit connector 50 is illustrated having suitable terminals for the resistance coil 16a and the electro-magnetic coil 40. These terminals are shown at 44, 46 and 48, 44 being a common terminal for both coils and 46 and 48 being for the resistance coil 16a and the magnetic coil 40, respectively.

A circuit somewhat similar to FIG. 2 is provided and differs therefrom in the added electrical connections for the coil 40. A switch is shown at 52 for controlling the energization of this coil so that it is energized only when necessary as, for instance, when the ignition of an engine is turned on.

From the foregoing specification, it will be obvious that I have provided a monitoring type of magnetic chip detector suitable for indicating and/or recording the flow of electricity through a resistance coil which is variably affected by the quantity of ferrous particles 17 collected thereon as illustrated in FIGS. 4 and 5. A detector of this character is particularly valuable in the operation of airplane engines and the like where malfunctioning caused by an accumulation of ferrous particles should be promptly called to the attention of the pilot. The utilization of a coil of resistance wire in relationship to a permanent or electro-magnet as shown effects a variation in the flow of electricity through the resistance coil dependent upon the accumulation of ferrous particles so that a feasible indication of such accumulation is had.

Some changes may be made in the construction and arrangement of the parts of my monitoring magnetic chip detector without departing from the real spirit and purpose of my invention, and it is my intention to cover by my claims any modified forms of structure or use of mechanical equivalents which may reasonably be included within their scope.

I claim as my invention.

1. In a monitoring magnetic chip detector of the character described, a magnet adapted to be positioned in a container for attracting ferrous particles from liquid in such container, a resistance wire adjacent said magnet, exposed to such liquid and on which the ferrous particles attracted by said magnet collect, said resistance wire being so disposed that spaced portions thereof may be short circuited by such particles and means for determining the amount of ferrous material short-circuiting said spaced portions of said resistance wire by measuring the current flowing through said resistance wire.

2. A device of the kind called for in claim 1 wherein said magnet and resistance wire are supported by a plug which is adapted to close an opening in such container and is removable with respect to such container whereupon the ferrous particles accumulated on said resistance wire may be removed therefrom.

3. In a monitoring magnetic chip detector of the character described, a magnetized element, means for supporting said element in a housing containing fluid in which ferrous particles may be present, said magnetized element being effective to attract such particles, and means to measure the amount of ferrous material so attracted comprising a coil of wire between said magnetized element and the fluid in said housing and exposed to such fluid, the turns of said coil being spaced apart and capable of being bridged by such particles, and means for measuring the electric current flowing through said coil of wire to determine the amount of ferrous material deposited by magnetic attraction on said coil and short-circuiting adjacent portions of the turns thereof.

4. A monitoring magnetic chip detector according to claim 3 wherein said magnetized element is an electro-magnet operable when energized to attract such particles and when de-energized to release them.

5. A monitoring magnetic chip detector according to claim 3 wherein said coil of wire is wound around said magnetized element and a layer of insulation is provided to electrically separate the two.

6. A monitoring magnetic chip detector according to claim 3 wherein said magnetized element and said coil of wire are supported by a plug which is removably associated with said housing whereby upon removal therefrom the ferrous material accumulated on said coil of wire may be removed.

7. A monitoring magnetic chip detector according to claim 3 wherein said means for measuring the electric current flow through said coil of wire comprises a recorder which continuously records such flow and provides a running record of the successive resistance decrease steps.

8. A monitoring magnetic chip detector according to claim 3 wherein said coil of wire is formed of resistance wire and said means for measuring the electric current flowing through said coil of wire is responsive to the change in resistance thereof resulting from variation in the quantity of such particles deposited in bridging relation to said adjacent portions of said turns of said coil.

References Cited
UNITED STATES PATENTS

| | | | |
|---|---|---|---|
| 2,429,920 | 10/1947 | Bourne | 335—305 |
| 2,450,630 | 10/1948 | Bourne | 335—305 |
| 2,716,165 | 8/1955 | Pfitzner | 340—270 |
| 2,878,342 | 3/1959 | Arthur | 335—305 |
| 2,936,890 | 5/1960 | Botstiber | 335—305 |
| 2,092,316 | 9/1937 | Lane | 324—41 |
| 2,105,851 | 1/1938 | Vobach et al. | 73—61 |
| 2,818,766 | 1/1958 | Hutchinson | 73—61 |
| 3,233,173 | 2/1966 | Lees et al. | 324—41 |

RUDOLPH V. ROLINEC, *Primary Examiner.*

R. J. CORCORAN, *Assistant Examiner.*